Oct. 1, 1968  K. A. BRANDENBERG  3,403,693
OR VALVE FOR FLUID LOGIC CIRCUITS
Filed Dec. 13, 1965

INVENTOR
KARL A. BRANDENBERG
BY Bair, Freeman & Molinare
ATTORNEYS

United States Patent Office 3,403,693
Patented Oct. 1, 1968

3,403,693
OR VALVE FOR FLUID LOGIC CIRCUITS
Karl A. Brandenberg, Hayward, Calif., assignor to The Aro Corporation, Bryan, Ohio, a corporation of Delaware
Filed Dec. 13, 1965, Ser. No. 513,215
7 Claims. (Cl. 137—112)

ABSTRACT OF THE DISCLOSURE

An OR valve unit for fluid logic circuits comprising a block-like valve body having a pair of inlets and an outlet at a face thereof adapted to be mounted on a fluid circuit board, the valve mechanism within the valve body being related to such face for maximum compactness. A resilient valve disc is arranged in the plane of the face and enclosed in the valve body between opposite valve seats which are centered with respect to one of the inlets, the other of the inlets communicating by means of a passageway past the periphery of the valve disc with the seat on the opposite side of the valve disc and the outlet communicating directly with the edge of the valve disc.

---

This invention relates to an OR valve for a fluid logic circuit mechanism of the type shown in my copending application, Ser. No. 479,758, filed Aug. 16, 1965.

One object of my present invention is to provide a special type of valve particularly designed for controlling fluid logic circuits such as those powered with compressed air, oil under pressure or the like wherein the valve is particularly adapted to mounting on a "circuit board" adapted to have a plurality of valve units mounted thereon and connected by means of the circuit board for performing various control and/or actuation duties in an assembly complex.

Another object is to provide a valve for fluid logic circuits which performs an "OR" function, the valve comprising a body having a pair of inlets and an outlet, and provided with a valve seat for each inlet wherein the seats are opposed to each other and are annular in character, one being smaller in diameter than the other and located within a cylindrical projection of the other so that a resilient valve disc interposed between the valve seats and spanning both of them may act as a normally closed valve element so that fluid pressure to either of the inlets will open the valve disc relative to the valve seat of an inlet which is pressurized, the valve body being so constructed as to communicate the outlet sides of the valve seats to an outlet chamber which in turn communicates with the outlet of the valve body.

Still another object is to provide the valve body with a face adapted to be mounted on a fluid circuit board, the pair of inlets and the oulet terminating at this face for fluid connection with the board.

A further object is to provide O-rings surrounding each of the inlets and the outlet and sealed against the circuit board thus establishing fluid-tight circuits relative thereto.

Still a further object is to provide the valve body formed in two parts for ready assembly, one having one of the valve seats and the other having the other valve seat so that before the two parts are assembled together, the valve disc may be interposed between the seats.

An additional object is to provide an O-ring seal between the two parts of the valve body located radially outward from the seats, the periphery of the valve disc and the periphery of the outlet chamber.

Another additional object is to provide a passageway from one of the inlets to the valve seat in one of the parts which extends through both parts and is provided with an additional O-ring seal for that portion of the passageway which provides for fluid flow from one part to the other.

A further additional object is to provide a novel form of O-ring seal between the parts of the valve body which combines in a single element the seal for the parts relative to each other and the seal around the passageway where it extends from one part of the valve body into the other part.

With these and other objects in view, my invention consists in the construction, arrangement and combination of the various parts of my OR valve for fluid logic circuits, whereby the objects above contemplated are attained, as hereinafter more fully set forth, pointed out in my claims and illustrated in detail on the accompanying drawing, wherein:

FIG. 4 is an enlarged sectional view through one of the OR valves showing it mounted on a circuit board adjacent another OR valve in a manner similar to that disclosed in my copending application above referred to;

Figure 1:
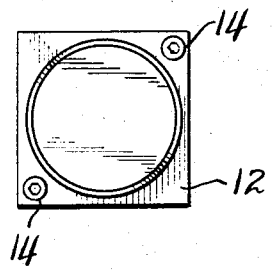
FIG. 1 is a plan view of an OR valve emboding my invention.
Figure 3:
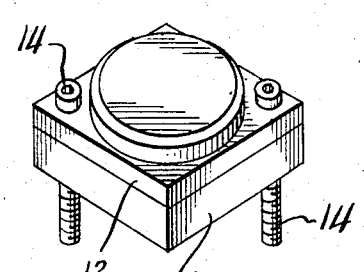
FIG. 3 is a perspective view thereof.
Figure 2:
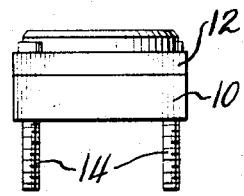
FIG. 2 is a side elevation thereof.
Figure 4:
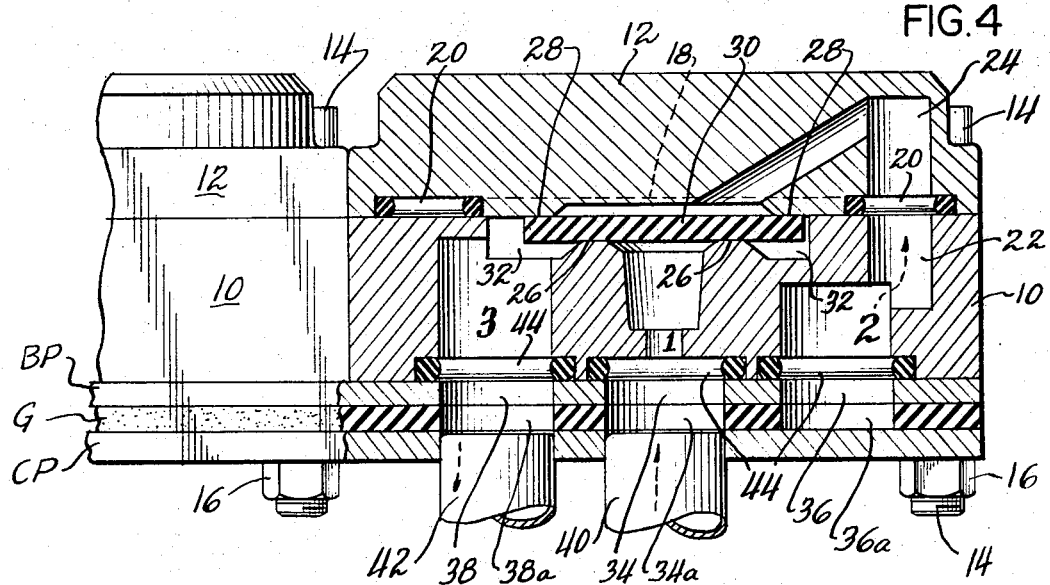
Figure 6:
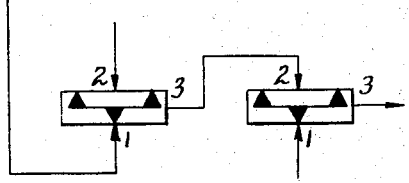
FIG. 6 is a fluid circuit diagram of two OR valves showing one circuit possibility and a diagrammatic representation for OR valves of the type herein disclosed.

On the accompanying drawing I have used the reference characters BP to indicate a base plate, G a gasket and CP a cover plate of a circuit board such as disclosed in my copending application, and the numerals 1 and 2 for inlets and 3 for an outlet in FIGS. 4 and 6. The OR valve herein disclosed is in the form of a unit such as shown in FIGS. 1, 2 and 3 and includes a valve body formed in two parts 10 and 12.

The parts 10 and 12 may be suitably secured together in leak-proof manner by clamping them together by means of screws 14 passing through suitable holes in the part 12 and threaded through the part 10, the lower ends of the screws projecting so that the elements BP, G and CP can be mounted thereon as shown in FIG. 4 and held in position by nuts 16. In order to seal fluid circuits between the two parts an O-ring 18 is provided and it is of special molded shape as shown in FIG. 5 with a pair of smaller O-ring elements 20 to seal around one or more passageways 22, 24 such as shown in FIG. 4 when the screws 14 are properly tightened down against the part 12 by screwing them into the part 10.

The valve body part 10 includes the two inlets 1 and 2 and the outlet 3 as illustrated in FIG. 4 and the inlet 1 terminates in an annular valve seat 26. The inlet 2 and the passageway 22, 24 terminate in an annular valve seat 28 located in the valve body part 12 opposing the valve seat 26. The diameter of the seat 26 is less than the diameter of the seat 28 and is located within a cylindrical projection of the seat 28 as obvious from an inspection of FIG. 4. This permits the use of a resilient valve disc 30, the thickness of which is slightly greater than the vertical distance between the seats 26 and 28 so that it is normally under slight pressure against the seats for closing them. This pressure can be initially adjusted, of course, by variations in the thickness of the valve disc as desired or required. Thus, I provide a pair of valve seats which are normally closed when there is no fluid pressure operable to open them.

An annular outlet chamber 32 surrounds the valve seats 26 and 28 and the periphery of the valve disc 30 and communicates with the outlet 3. The inlets 1 and 2 and the outlet 3 terminate at the lower face of the valve body part 10 so that this face is adapted to be mounted on a fluid circuit board as illustrated (specifically against the upper surface of the base plate BP) and in alignment with certain passageways 34, 34a, 36, 36a, 38 and 38a as shown in FIG. 4 which provide for circuit connections within the circuit board. By way of example, the passageway 36a may extend laterally through the gasket G from some other valve unit such as the left hand one shown in FIG. 4 whereas the passageways 34 and 34a may communicate with a pipe connection 40 and the passageways 38 and 38a may communicate with a pipe connection 42, or other pressure fluid connections can be made to the inlets and the outlet as desired. By having the inlets 1 and 2 and the outlet 3 terminate at the lower face of the valve body part 10, fluid circuit connections of the type referred to are readily made and sealing can be effectively accomplished by the use of O-rings 44. It is merely necessary to have these O-rings surround the inlets and the outlet and resiliently engage adjacent faces of the base plate BP and the valve body part 10.

Figure 5:
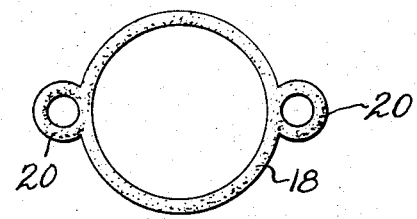
FIG. 5 is a plan view of a special type of O-ring seal at a scale of about half of FIG. 4.

By providing the special type of O-ring 18, 20 shown in FIG. 5, the portion 18 thereof seals around the periphery of the outlet chamber 32 and between the valve body parts 10 and 12 while the right hand O-ring part 20 seals the portion of the passageway 22, 24 that conducts fluid from the valve body part 10 to the valve body part 12. An additional O-ring part 20 at the left in FIGS. 4 and 5 is provided in case additional passages similar to 22 and 24 are required for certain types of valves thus making the special type of O-ring universally adaptable for either one or two passageway types of valves.

A valve such as herein disclosed performs an OR function, that is it provides a logic function in which the valve has at least two inputs and one output. The output is ON if one or more inputs is ON and is OFF only if both inputs are OFF. This OR function can be solved with double check valves if the usual method of providing valves and piping them together is used as shown for instance in my Patent No. 3,196,890. However, an OR valve of the type herein disclosed simplifies the valve construction and also simplifies circuit connections when designed for mounting on a circuit board as disclosed in FIG. 4 and in the manner more fully disclosed in my copending application hereinbefore referred to. In the present disclosure the active part of the valve is a single flat resilient disc of rubber, neoprene or the like and the device performs the following functions which allow three-way OR-gating.

Flow is possible only from:
Input 1 to output 3
Output 3 to input 1 (only if input 2 is not ON)
Input 2 to output 3

The number of OR valves is equal to the number of inputs minus 1. The output is ON (pressurized) if one or more inputs are ON (see FIG. 6).

Summarizing the design and operating description of the OR valve:

The valve disc touches both seats if both inputs are OFF. Pressure from either input 1 or input 2 will force the valve disc from its respective seats thereby pressurizing the output 3 (ON).

From the foregoing description it will be obvious that I have provided a comparatively simple valve unit adaptable for circuit board mounting which performs the OR function. The valve involves a minimum number of parts, is very simple to assemble, and the mounting of the assembly on a circuit board can be accomplished with a minimum of effort.

Some changes may be made in the construction and arrangement of the parts of my OR valve for fluid logic circuits without departing from the real spirit and purpose of my invention, and it is my intention to cover by my claims any modified forms of structure or use of mechanical equivalents which may reasonably be included within their scope.

I claim as my invention:

1. An OR valve for fluid logic circuits comprising a block-like valve body having a bottom face adapted to be mounted on a fluid circuit board, a pair of inlets and an outlet, one of said inlets being substantially centered in said valve body, said pair of inlets and said outlet terminating at said face and extending upwardly therefrom, an annular valve seat for each of said inlets, said valve seats being opposed to each other and in planes substantially parallel to said bottom face of said valve body, one of said valve seats being smaller in diameter than the other and located within a cylindrical projection of the other, said valve seats being centered with respect to said one of said inlets, a resilient valve disc interposed between said valve seats and spanning both of them, one of said valve seats being located on the side of said valve disc opposite said bottom face of said valve body, a passageway in said valve body extending from the other of said inlets past the periphery of said valve disc to said one of said valve seats, said valve disc being normally closed against both valve seats whereby fluid pressure to either of said inlets will open said valve disc relative to the valve seat of the inlet which is pressurized, said valve body having an outlet chamber communicating the outlet side of each valve seat with said outlet.

2. An OR valve for fluid logic circuits according to claim 1 wherein said valve body has a ring seal surrounding the end of each of said pair of inlets and said outlet adjacent said face, said ring seals being sealed against the adjacent face of the circuit board.

3. An OR valve for fluid logic circuits according to claim 1 wherein said valve body is formed in two parts, one having one of said seats and the other having the other of said seats whereby said valve disc is mounted between said parts, and means to secure said parts together, said last mentioned means also securing said OR valve to the circuit board.

4. An OR valve for fluid logic circuits comprising a valve body having a face adapted to be mounted on a fluid circuit board, a pair of inlets and an outlet, said pair of inlets and said outlet terminating at said face, an annular valve seat for each of said inlets, said valve seats being opposed to each other and one being smaller in diameter than the other and located within a cylindrical projection of the other, a resilient valve disc interposed between said seats and spanning both of them, said valve disc being normally closed against both valve seats whereby fluid pressure to either of said inlets will open said valve disc relative to the valve seat of the inlet which is pressurized, said valve body having an outlet chamber communicating the outlet side of each valve seat with said outlet, said valve body being formed in two parts, one having one of said seats and the other having the other of said seats whereby said valve disc is mounted between said parts, means to secure said parts together, said last mentioned means also securing said OR valve to the circuit board, a ring seal provided between said parts and located radially outward from said seats, the periphery of said valve disc and the periphery of said outlet chamber.

5. An OR valve for fluid logic circuits according to claim 3 wherein a passageway from one of said inlets to the valve seat in one of said parts extends through both parts, and an additional a ring seal is provided for that portion of said passageway which provides for fluid flow from one of said parts to the other.

6. An OR valve for fluid logic circuits according to claim 4 wherein a passageway from one of said inlets to the valve seat in one of said parts extends through both parts, an additional ring seal is provided for that portion of said passageway which provides for fluid flow from one of said parts to the other, said first mentioned ring seal and said additional ring seal being combined in a single element.

7. An OR valve for fluid logic circuits according to claim 1 wherein said valve body is formed in two parts, one having one of said seats and the other having the other of said seats whereby said valve disc is mounted between said parts, and means to secure said parts together comprising screws through one of said two parts and threaded into the other of said parts, said screws also extending through the circuit board, and nuts thereon to retain said OR valve mounted on the circuit board and parts of the circuit board assembled relative to each other.

References Cited

UNITED STATES PATENTS

| 3,025,878 | 3/1962 | Hupp | 137—608 |
| 3,225,117 | 12/1965 | Lootzook | 137—81.5 |
| 3,285,267 | 11/1966 | Groth | 137—102 |

OTHER REFERENCES

Steiner, "Universal Modular System For Pneumatic Switching Controls," July 1964, "Process Control and Automation," p. 310-312.

WILLIAM F. O'DEA, *Primary Examiner.*

H. M. COHN, *Assistant Examiner.*